(No Model.) 2 Sheets—Sheet 1.

J. W. HYATT.
SPRING ROLL FOR ROLLER BEARINGS.

No. 487,530. Patented Dec. 6, 1892.

Attest:
L. Lee
Edw. F. Kinsey

Inventor
J. W. Hyatt, per
Crane & Miller, Attys.

(No Model.) 2 Sheets—Sheet 2.

J. W. HYATT.
SPRING ROLL FOR ROLLER BEARINGS.

No. 487,530. Patented Dec. 6, 1892.

Attest:
L. Lee.
Edw. F. Kinsey.

Inventor.
J. W. Hyatt, per
Crane & Miller, Attys.

UNITED STATES PATENT OFFICE.

JOHN W. HYATT, OF NEWARK, NEW JERSEY.

SPRING-ROLL FOR ROLLER-BEARINGS.

SPECIFICATION forming part of Letters Patent No. 487,530, dated December 6, 1892.

Application filed August 16, 1892. Serial No. 443,272. (No model.)

*To all whom it may concern:*

Be it known that I, JOHN W. HYATT, a citizen of the United States, residing at Newark, Essex county, New Jersey, have invented certain new and useful Improvements in Spring-Rolls for Roller-Bearings, fully described and represented in the following specification and the accompanying drawings, forming a part of the same.

The object of this invention is partly to prevent the wear and disintegration which result from the use of solid or unyielding antifriction-rolls. Such rolls have been heretofore used in antifriction journal-boxes for car-axles, as shown in my patent, No. 388,136, issued August 21, 1888, for improvements in dust-guards for axle-boxes; and my present invention is designed to obviate some of the objections which arise from the use of solid antifriction-rolls.

My invention further consists in an improvement in the dust-guard for such axle-boxes.

The antifriction-rolls in my improved construction are formed of spiral springs, which are inserted movably within the periphery of a cylindrical casing in the same manner as solid rollers have been heretofore used. The journal-box is shown herein provided with several series of spiral springs, each consisting of seven springs or rolls, and annular plates being inserted between the ends of the springs in the several series to hold the springs of each series in place. The wire is preferably formed of rectangular cross-section and wound with the coils in contact, so that the periphery of the spring forms a continuous cylindrical surface, which after the spring is hardened may be readily ground to a true cylindrical shape. The ends of the spring are flattened in planes at right angles to the periphery, and a sufficient number of such springs is formed of the same length or thickness to encircle the axle when placed in a single series around the same within the axle-box. Two or more of such series may be inserted in the same box with annular plates to separate the series from one another, such plates touching the flattened ends of the spring and thus holding several springs of each series in place.

Figures 1, 2:
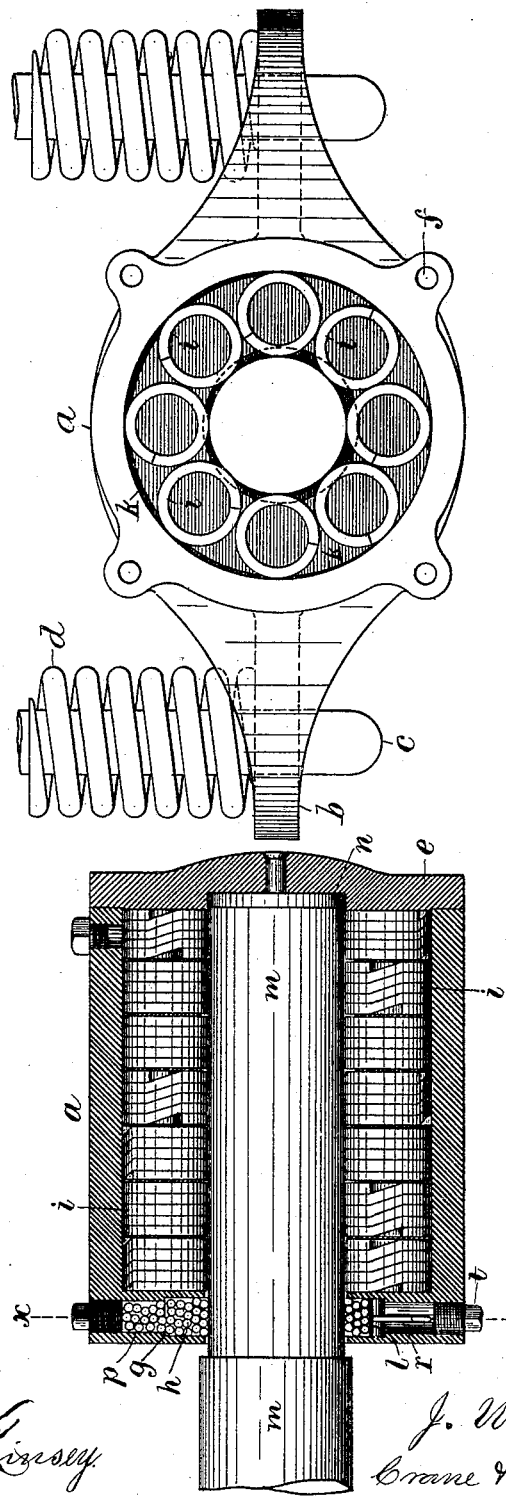
Figure 6:
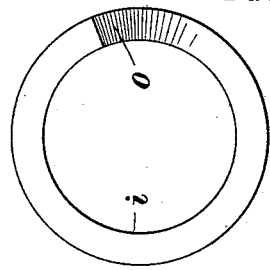
Figure 5:
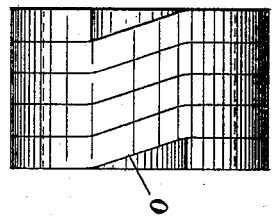
Figure 4:
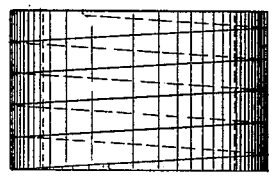
Figure 3:
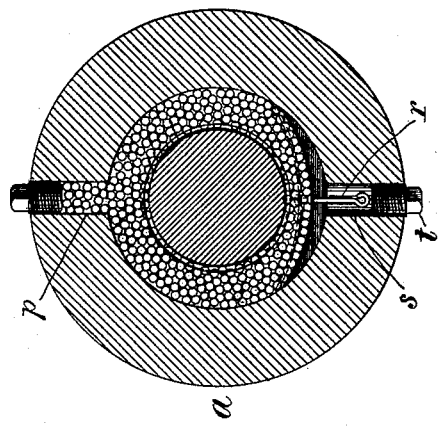

The annexed drawings show seven series of springs separated by six annular plates, Figure 1 being a front elevation of a car-axle box with the front cover removed, and Fig. 2 being a longitudinal section of the box with sufficient of the springs removed to exhibit the axle. Fig. 3 is a transverse section of the box through the dust-guard on line *xx* in Fig. 2. Fig. 4 is a side view of a spring-roller with uniformly-inclined coils. Fig. 5 is a side view of a spring-roller with offset coils, and Fig. 6 is an end view of the springs shown in Figs. 4 and 5. Figs. 1 to 3 are upon a reduced scale.

The car-axle box shown in the drawings consists in a cylindrical shell $a$, with lugs $b$ adapted to hold the same upon the truck, only the guide-pins $c$ and truck-springs $d$ being shown in the drawings. A cover $e$ is shown secured upon the front of the box by bolts $f$, and a channel $g$ is formed in the flange at the rear of the box, adjoining the axle, to receive shot $h$, as described in my patent, No. 388,136, dated August 21, 1888.

In Fig. 2 are shown seven series of coiled springs, (lettered $i$,) each series containing seven springs, as shown in Fig. 1, with their adjacent edges in contact. Six annular plates or washers $k$ are inserted between the seven series of springs, thus holding each series in place and preventing interference between the springs of the several series in their rotations within the box. A car-axle $m$ is shown sustained by the spring-rollers, with an antifriction-plate $n$ inserted in the cap $e$ to sustain the end-thrust.

The coils of the springs are shown formed of square wire or rods, Figs. 4 to 6 showing the spring-roller of full size. In Fig. 4 the coils of the spring are shown of uniform inclination, as in an ordinary spiral spring, with the rod or wire tapered at the opposite ends to form a flat end upon the spring at right angles to its periphery. In Fig. 5 each coil of the spring is wound chiefly in a flat plane, with an offset or inclined bend $o$ at the end of each coil, by which the ends of the spring are flattened without tapering the end of the rod or wire. With either construction the spring is adapted by its flattened ends to roll with its ends against a flat surface, like the cap $e$ or annular plates $k$, and the springs in each series being made of the same length or thickness and proportioned to touch one another at their peripheries they completely fill the space provided for them in the journal-box and roll around the axles without obstruction or interference. With rollers of solid material it is obvious that any inequalities in the shape of the axle, the journal-box, or the roller will impose a greater load upon one roller than upon another. Such inequalities frequently arise in the manufacture of roller-boxes, and the undue load imposed upon certain of the rollers tends to disintegrate the same or the surface with which they are in contact when thus overloaded.

By forming the rollers of elastic coils, as shown herein, the coils are adapted to contract or close up when subjected to such pressure, and it is evident that any undue load imposed upon one roller will therefore cause it to yield and distribute the load upon the other rollers.

In a journal-box provided entirely with spring-rollers the wear upon the rollers and upon the surfaces with which they are in contact is thus equalized in a very great degree, and the inequalities in the form of the rollers or of such surfaces is compensated and the jars and strains induced from inequalities are practically obliterated.

It is well known that roller journal-boxes have not been adopted for railroad-car axles, as it has been found in practice that objections existed to the use of such boxes; but such objections are reduced to a minimum by the use of spring-rollers, as the axle revolves without jar or noise in contact with such rollers, and the destructive wear which is incident to inequalities when solid rollers are used is wholly obviated. The spring-rollers are preferably ground after hardening upon the peripheries and flattened sides, so as to make them uniform in dimensions and perfect in shape, and the most perfect operation of the rollers is secured with such construction.

In Figs. 2 and 3 I have shown an improvement in the dust-guard formed of metallic shot, the improvement consisting in the application of a spring-plate $l$ to the lower part of the channel $g$, in which the shot $h$ are inserted, the plate having an elastic tension toward the lower side of the axle, by which the shot are kept in contact therewith. To produce such tension, a rigid plate may be pressed upward by a spring, or an elastic leaf $l$—such as is shown in Fig. 3—may be fitted transversely to the channel $g$ below the axle. To develop the desired tension in such an elastic leaf, it may be pressed downward by crowding the shot into the channel through an inlet $p$, or the leaf may be held downward while filling the channel with shot by means of a pull-rod $r$. Such rod is shown in Fig. 3 projected downward into an inlet $s$, which is extended into the bottom of the channel and provided with a plug $t$ to prevent the escape of lubricant or the introduction of dust. By removing the plug a hook may be applied to an eye formed upon the end of the pull-rod and the spring held downward in the position shown in full lines in Fig. 3 while the shot are applied, the normal position of the spring being indicated in dotted lines at a higher level, which position the spring would tend to assume, and thus keep the shot in contact with the under side of the axle, as desired.

Where oil is used in connection with a roller-bearing to reduce the wear upon the moving surfaces, the oil is liable to clog the shot, which when compacted together may settle below the bottom of the axle; but the spring shown herein operates positively to hold them up to the axle, while their weight tends to pack them with equal certainty upon its upper side. The dust-guard is thus rendered perfect, and the dirt is absolutely excluded from the wearing-surfaces within the box.

What I claim as my invention is—

1. A roller journal-box consisting in a cylindrical casing having a series of spiral springs inserted movably within its periphery to support the axle, as set forth.

2. An antifriction journal-box consisting in a cylindrical casing having several series of spiral springs inserted within its periphery, with annular plates between the ends of the springs in the several series to hold the springs of each series in place, as set forth.

3. In an antifriction journal-bearing, the combination, with a cylindrical casing, of several parallel series of cylindrical springs having the ends of the springs flattened at right angles to their peripheries and annular plates interposed between the flattened ends of the springs, substantially as set forth.

4. The combination, with an axle-box provided with the channel $g$, of the loose metallic shot inserted in the said channel and the spring-plate $l$ inserted beneath the shot in the lower part of the channel, as set forth.

5. The combination, with an axle-box provided with the channel $g$ and outlet $s$, of the loose metallic shot inserted in the said channel, the elastic plate E', fitted to the lower part of the channel with plug to close the outlet, and the pull-rod attached to the spring-plate and extended downward into the outlet, as set forth.

In testimony whereof I have hereunto set my hand in the presence of two subscribing witnesses.

JOHN W. HYATT.

Witnesses:
THOMAS S. CRANE,
FRANK L. MORTON.